Jan. 7, 1941. C. T. EVANS 2,227,577
ELECTRICAL CIRCUIT CONTROLLING SYSTEM
Filed April 22, 1940 3 Sheets—Sheet 1
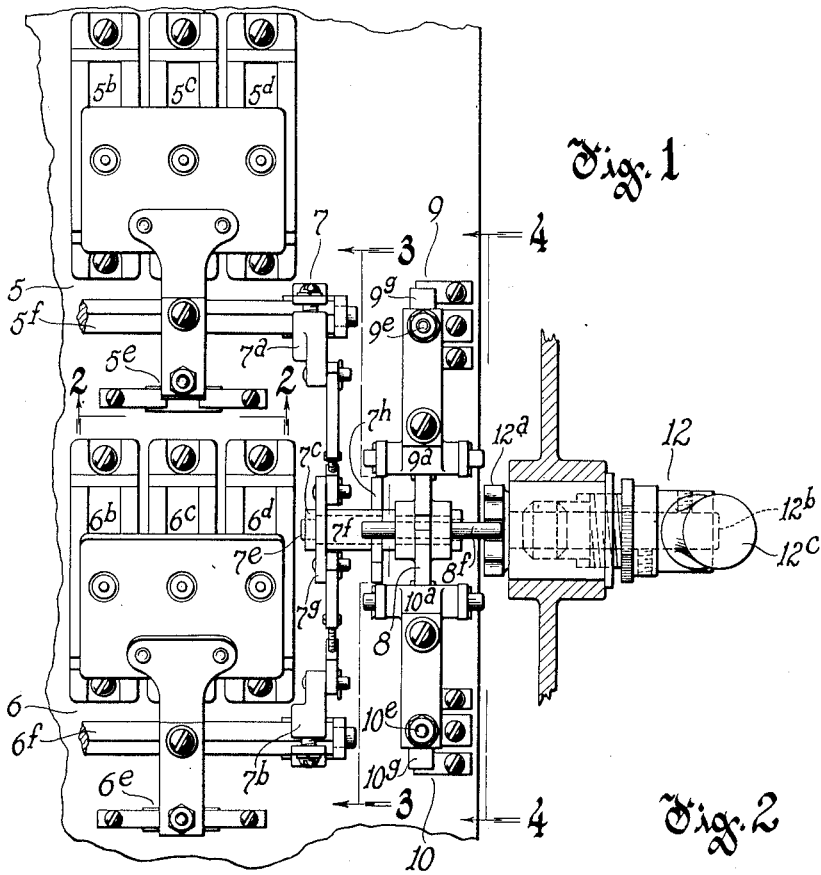
Fig. 1
Fig. 2
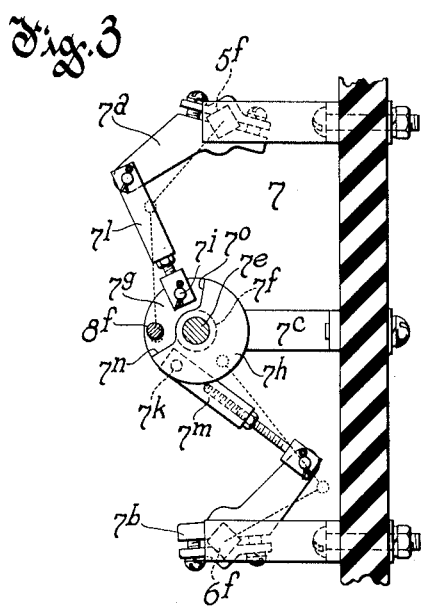
Fig. 3
Inventor
Clarence T. Evans.
By Frank H. Hubbard
Attorney

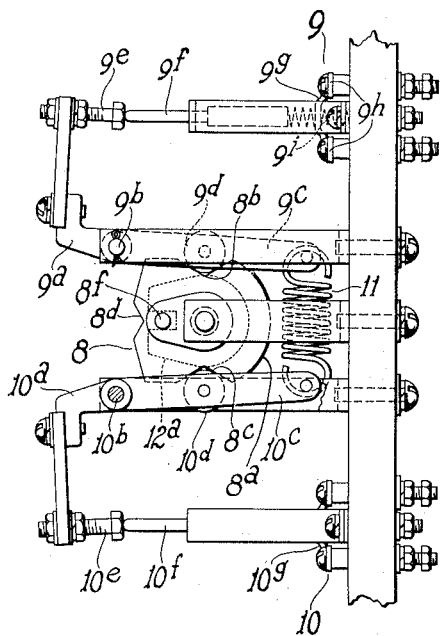
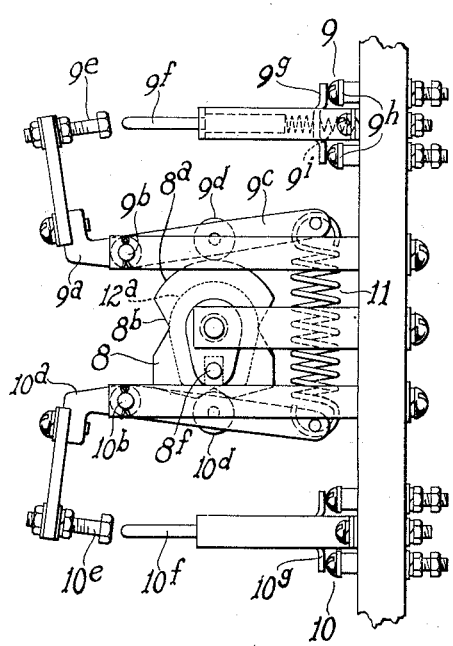
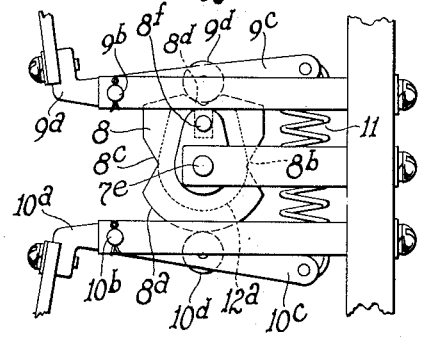

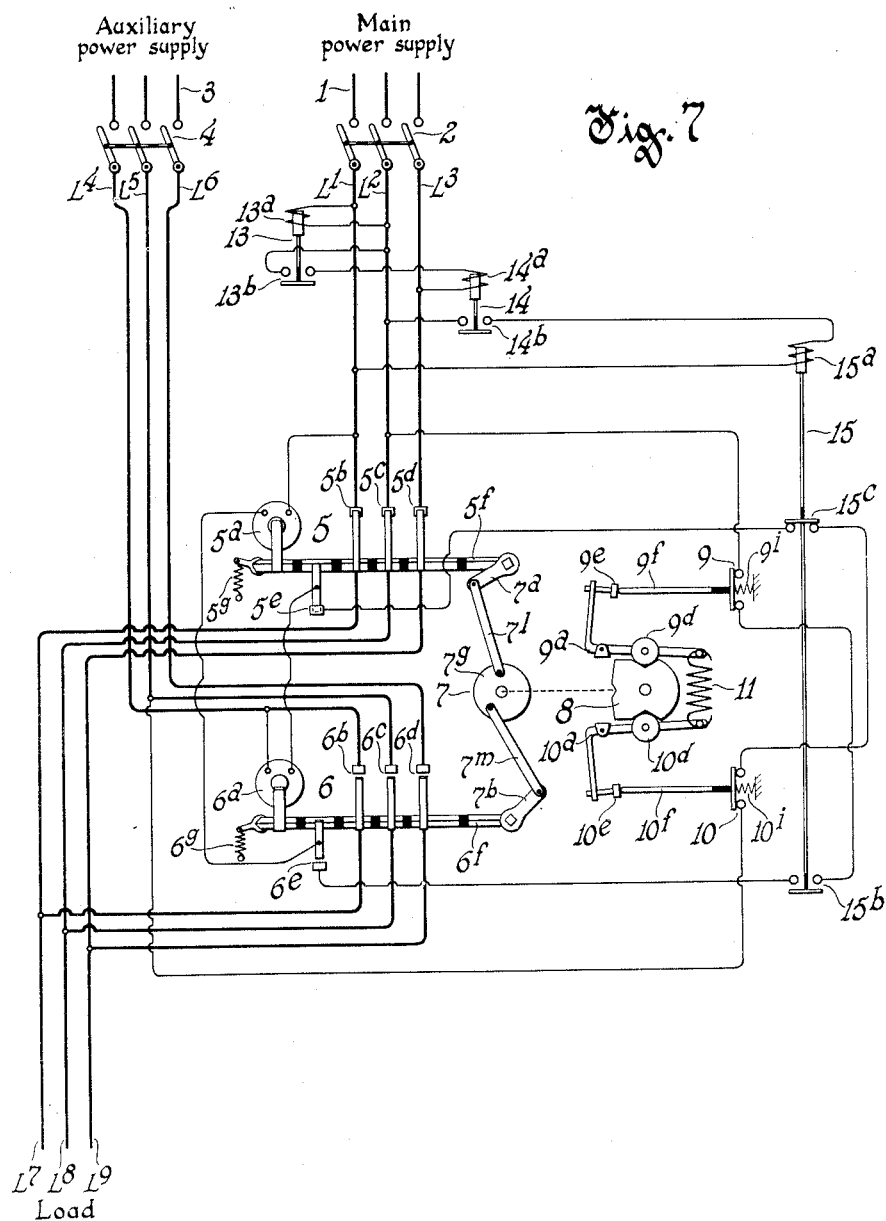

Patented Jan. 7, 1941

2,227,577

UNITED STATES PATENT OFFICE 2,227,577

ELECTRICAL CIRCUIT CONTROLLING SYSTEM

Clarence T. Evans, Wauwatosa, Wis., assignor to Cutler-Hammer, Inc., Milwaukee, Wis., a corporation of Delaware Application April 22, 1940, Serial No. 330,924

8 Claims. (Cl. 171—97)

The invention relates to a system for transferring an electrical load from a normal or main supply circuit to an emergency or auxiliary supply circuit at the will of the operator; or automatically, if the power of the normal supply system should fail, and for the automatic reconnection of the load to the normal supply circuit if power thereon is reestablished; or alternatively and at the will of the operator for permanent connection of the load to the emergency supply circuit irrespective of the power conditions of the normal supply circuit.

The system is particularly applicable to installations on board of war vessels where electrical apparatus is subjected to shocks which may cause the undesirable opening of electromagnetically operated switches with the even more undesirable result that they stay open when it is imperative that they should reclose again. Where electromagnetically operated switches each have their respective operating magnet energized only temporarily for closing the switch which then is mechanically latched in closed position, the latch may open due to the shock aforementioned resulting in failure of power for important equipment. In installations of the kind mentioned it is also desirable to provide for closure of the switches manually in extreme cases and to maintain them closed or locked in such position. The present invention provides a switch mechanism which meets all of the aforementioned conditions and may therefore be termed shockproof.

An object of the invention is to provide, in a system comprising a main supply circuit, an auxiliary supply circuit and a load circuit, for normally connecting the load circuit to the main supply circuit and to automatically transfer to the auxiliary supply circuit upon a failure or reduction of voltage below a predetermined minimum in the main supply circuit.

Another object is to provide a system of the aforementioned character in which the load circuit if automatically connected to the auxiliary supply circuit is automatically returned to the main supply circuit when normal power conditions have been reestablished in the latter.

Another object is to provide in a system of the aforementioned character a pair of electromagnetically operated switches for respectively connecting the load circuit to a main power supply and to an auxiliary power supply whereby the respective switch after having responded to energization is latched in closed position and its operating circuit is deenergized.

Another object is to provide a mechanical interlock and an electrical interlock for the two electromagnetic switches whereby only one or the other of the switches can be energized and/or closed at any time.

Another object is to provide two electromagnetic switches arranged in such a manner that when either switch has responded to and has been closed by the electromagnetic operating means and tends to open upon receiving a shock, it is closed again automatically by its electromagnet which under these conditions is temporarily energized by the cooperative action of the other switch.

Another object is to provide for selective electromagnetic or manual operation of a pair of electromagnetic switches of the aforementioned character.

Another object is to provide a system which may be operated at the will of the operator to permanently connect the load to the auxiliary circuit regardless of the power conditions of the normal supply circuit.

The accompanying drawings illustrate an embodiment of the invention wherein:

Figure 1 is a front elevation of certain of the mechanical elements of a system embodying the invention.

Fig. 2 is a fragmentary view, partly in section and partly in elevation, on the line 2—2 of Figure 1.

Figure 3 is a fragmentary view, partly in section and partly in elevation, on the line 3—3 of Figure 1.

Fig. 4 is a fragmentary side elevational view of the mechanism on the line 4—4 of Fig. 1.

Figs. 5 and 6 are fragmentary side elevational views of the mechanism, similar to Fig. 4, but showing the various parts thereof in different positions, and Fig. 7 is a circuit diagram of the system.

The system illustrated may be supplied with power from a main power supply 1 through a triple pole line switch 2 (Fig. 7) by means of which the bus bars $L^1$, $L^2$ and $L^3$ may be connected to the power supply 1, or from an auxiliary supply system 3 which may be connected to the bus bars $L_4$, $L_5$ and $L_6$ through a triple pole line switch 4.

The transfer switch proper comprises two electromagnetically operated switches 5 and 6. The switch 5 has an energizing winding $5^a$, normally open main contacts $5^b$, $5^c$ and $5^d$, and auxiliary contacts $5^e$ which are adapted to be open when the main contacts are open and to be closed when the main contacts are closed and which are shown in detail in Fig. 2. Similarly switch 6 has a magnetizing winding 6ᵃ, normally open main contacts 6ᵇ, 6ᶜ and 6ᵈ and auxiliary contacts 6ᵉ which are similar to those shown at 5ᵉ in Fig. 2.

The movable contact members of the switches 5 and 6 are operated by rocking shafts 5ᶠ and 6ᶠ, respectively, to which the armatures of the respective electromagnets are connected to oscillate the shafts between the open and closed positions in a well known manner. The two shafts 5ᶠ and 6ᶠ are provided with biasing springs 5ᵍ and 6ᵍ respectively, which bias the respective shafts to an open switch position, and are connected to an interlocking mechanism 7 shown in detail in Fig. 3. Attached to the shaft 5ᶠ is a lever 7ᵃ and a similar lever 7ᵇ is attached to the shaft 6ᶠ. An L-shaped bearing bracket 7ᶜ is mounted substantially equidistantly from the shafts 5ᶠ and 6ᶠ in a line adjacent one end of each of the latter. The bracket 7ᶜ carries a shaft 7ᵉ on which is rotatably mounted a sleeve 7ᶠ which is provided at its ends with circular flanges 7ᵍ and 7ʰ, respectively. The flange 7ᵍ carries two crank pins 7ʲ and 7ᵏ (Fig. 3) to which are pivotally connected adjustable connecting rods 7ˡ and 7ᵐ, respectively, the other ends of said connecting rods being pivotally connected to the ends of levers 7ᵃ and 7ᵇ respectively, the entire arrangement being such, that when the shaft 5ᶠ is turned counterclockwise the shaft 6ᶠ is forced to turn clockwise and vice versa so that when the main contacts of switch 5 are closed the main contacts of switch 6 are forced open and vice versa. The toggles formed by the pin 7ʲ and lever 7ˡ on one hand and the pin 7ᵏ and lever 7ᵐ on the other hand are arranged so that in the switch closing position of the shafts 5ᶠ and 6ᶠ, respectively, the toggle of the respective switch locks, such locking action being amplified by the torque exerted on the disc 7ᵍ by the biasing forces acting on the shaft of the other switch, which forces are transmitted through the respective elements of the interlocking device 7.

Pivotally supported on the shaft 7ᵉ is also a cam 8 which cam is provided with a circular surface 8ᵃ (Figs. 4 to 6) covering an arc of less than 180°, and symmetrical to the center line of said arc are arranged two indentations or notches 8ᵇ and 8ᶜ, the notches being diametrically opposed to each other. Another notch 8ᵈ is arranged diametrically opposite to the cam surface 8ᵃ on the center line of symmetry thereof. The cam is adapted to operate two switches 9 and 10, respectively. Switch 9 comprises a bell crank lever 9ᵃ which is pivoted at 9ᵇ and has an arm 9ᶜ which is provided intermediate its ends with a roller 9ᵈ which is held in engagement with the perimeter of the cam 8 by means of a spring 11. Insulatedly mounted at the end of the other arm of the lever 9ᵃ is an adjustable rod 9ᵉ which engages a push rod 9ᶠ of a bridging member 9ᵍ which is adapted to bridge stationary contacts 9ʰ and which is biased away from said stationary contacts by a spring 9ⁱ. When the lever 9ᵃ of the switch 9 is rotated clockwise by the co-action of the spring 11 and the cam 8 the contacts of said switch are closed.

The switch 10 is similarly arranged at the side of the cam 8 opposite to that of the switch 9. The cam 8 is provided with an eccentric pin 8ᶠ which engages a coupling 12ᵃ (Fig. 1) mounted on the shaft 12ᵇ of a manual operating device 12, the shaft 12ᵇ being mounted in actual alinement with the shaft 7ᵉ and being provided with a handle 12ᶜ. The pin 8ᶠ is also adapted to engage the flange 7ʰ under certain conditions. For that purpose the flange 7ʰ has a sector removed therefrom so as to form the abutment surfaces or edges 7ⁿ and 7ᵒ. In the normal position the pin 8ᶠ is in a horizontal plane passing through the axis of the shaft 7ᵉ, and as shown in Fig. 3, the sleeve 7ᶠ is free to rotate from the position shown in a counterclockwise direction without interference by the pin 8ᶠ so as to permit closure of either the switch 5 or the switch 6, the cam 8 occupying the position shown in Fig. 4 wherein the switches 9 and 10 are in circuit closing position. If it should be desired by the operator to lock the switch 6 in the closed position and prevent closure of switch 5 irrespective of the power conditions of the main circuit, he rotates the cam 8 by means of the operating handle 12ᶜ in a counterclockwise direction thus opening the switches 9 and 10, as shown in Fig. 5, which makes it impossible to energize either the coils 5ᵃ or 6ᵃ. At the same time the pin 8ᶠ abuts the surface 7ⁿ of the flange 7ʰ and through the operating mechanism shown in Fig. 3 rotates the shaft 5ᶠ counterclockwise to open the switch 5 if it should be closed and rotates the shaft 6ᶠ clockwise to close and lock the switch 6 if it should not be closed already.

It will be noted that as shown in Fig. 3 the crank formed by the flange 7ᵍ, crank pin 7ᵏ and rod 7ᵐ is now moved to the other side of the center of the crank shaft 7ᵉ, as shown in dotted lines, so that the switch 6 is securely locked in the closed position. At the same time the operating lever 12ᶜ is latched and the switches 9 and 10 are retained in open position by the cooperation of the roller 10ᵈ and the cam 8, as shown in Fig. 5. The system is thus latched in the emergency position until the operator rotates the operating lever 12ᶜ in a clockwise direction to restore the cam to the position shown in Fig. 4, whereby switch 6 remains closed, but the resulting closure of switches 9 and 10 permits automatic operation of the system, as will hereinafter be explained. If the operator desires to close and latch switch 5, he continues clockwise rotation of the cam 8 by the operating handle 12ᶜ until the cam occupies the position shown in Fig. 6, wherein the contacts 9 and 10 are open to prevent automatic operation.

The system further comprises an electromagnetic relay 13 (Fig. 7) having normally open contacts 13ᵇ and an energizing coil 13ᵃ connected across the lines L¹ and L². An electromagnetic relay 14 having normally open contacts 14ᵇ and an energizing winding 14ᵃ which is connected across the lines L² and L³ in series with the normally open contacts 13ᵇ. The relays 13 and 14 jointly control the relay 15 having an energizing winding 15ᵃ which is connected across lines L¹ and L² in series with the normally open contacts 14ᵇ. Relay 15 is provided with normally open contacts 15ᵇ and normally closed contacts 15ᶜ. A circuit is provided from line L¹ through the energizing winding 5ᵃ of the switch 5, auxiliary contacts 6ᵉ, normally open contacts 15ᵇ, through the contacts of switch 9, when closed, to line L². A circuit is also provided from line L¹ through energizing winding 6ᵃ, auxiliary contacts 5ᵉ, normally closed contacts 15ᶜ, through the contacts of switch 10, when closed, to line L².

The relays 13, 14 and 15 have their energizing windings constructed and calibrated in such a manner that they will exert a sufficient force on their respective armatures to pull them into their operative positions when the voltage exceeds a certain minimum and to drop back to the inoperative positions thereof when the voltage is below such minimum. Normally with the main power supply circuit sufficiently energized the relays 13, 14 and 15 are energized, whereby the contacts 15$^b$ are closed and the contacts 15$^c$ are open. Furthermore with the cam 8 in the position thereof shown in Fig. 4, the switches 9 and 10 are closed. As will be noted, with the contacts 15$^c$ open the energizing winding 6$^a$ is deenergized even though power is available on the emergency busses L$^4$, L$^5$ and L$^6$. On the other hand, the energizing winding 5$^a$ of switch 5 is energized through a circuit from L$^2$ over the contacts of switch 9, contacts 15$^b$ and 6$^e$, coil 5$^a$ to L$^1$, and the switch 5 is closed by its magnet so that the busses of the translating circuit L$^7$, L$^8$ and L$^9$ are connected to the busses L$^1$, L$^2$ and L$^3$. Closure of switch 5 closes the auxiliary contacts 5$^e$ so as to permit energization of switch 6 upon closure of contacts 15$^c$, while the interlocking mechanism 7, by the overcenter movement of the pin 7$^k$ aforedescribed, provides for a mechanical interlock which also prevents the closure of switch 6 as long as the main contacts of switch 5 are closed; it being, of course, assumed that the operating handle and the cam 8 are in the automatic position shown in Fig. 4.

If now the voltage of the main power supply should decrease or the power should fail, the relays 13, 14 and 15 drop their armatures thereby opening the contacts 13$^b$, 14$^b$ and 15$^b$ and closing the contacts 15$^c$. Closure of contacts 15$^c$ causes energization of the coil 6$^a$ through a circuit from L$^4$, through coil 6$^a$, contacts 5$^e$, 15$^c$ and 10 to L$^5$, which results in operation of switch 6 to close its main contacts and connect the translating circuit to emergency supply lines L$^4$, L$^5$ and L$^6$. As soon as shaft 6$^f$ starts to rotate upon energization of coil 6$^a$, it causes opening of switch 5 through action of the interlock 7. If power should be restored again to the main power supply circuit so as to actuate the relays 13, 14 and 15 to their attracted positions, the energizing coil 6$^a$ will again be deenergized and the energizing coil 5$^a$ energized thus reconnecting the translating circuit to the normal power supply.

If for any reason the energizing circuit of the respective electromagnetic switch 5 or 6 should be defective or if the operator desires for any other reason to connect the translating circuit to either the normal or the emergency supply, he operates the handle 12 in a clockwise or counterclockwise direction to thereby manually close the switches 5 or 6, respectively, as aforedescribed. In so doing automatic operation of the system is positively prevented until the cam 8 is again returned to the position thereof shown in Fig. 4.

If one or the other of the switches 5 and 6 is closed with the cam 8 in the position shown in Figs. 1, 4 and 7, and the switch should momentarily open due to a shock from gun fire or the like, such opening causes simultaneous rotation of the shaft of the other switch to circuit closing position, thus closing first the auxiliary switch 6$^e$ or 5$^e$, respectively. This reenergizes the magnet coil 5$^a$ or 6$^a$ of the previously closed switch to reclose it again, thus maintaining the equipment in the desired operating condition.

What I claim as new and desire to secure by Letters Patent is:

1. A circuit controller comprising individual switches adapted upon closure to connect a translating circuit to a main supply circuit or to an auxiliary supply circuit selectively, an operating magnet for each of said switches energizable alternatively to close the respective switch, each of said switches being provided with means for biasing it to its open position and including means operable upon movement of either switch toward its closed position to render the locking means of the other switch inoperative and to open the latter and when open to lock the first switch closed, and means to deenergize said magnets when the respective switch is closed.

2. A circuit controller comprising individual switches adapted upon closure to connect a translating circuit to a main supply circuit or to an auxiliary supply circuit selectively, an operating magnet for each of said switches energizable alternatively to close the respective switch, each of said switches being provided with means for biasing it to its open position and including means operable upon movement of either switch toward its closed position to render the locking means of the other switch inoperative and to open the latter and when open to lock the first switch closed, means to deenergize said magnets when the respective switch is closed, and means adapted to reenergize said last named switch upon accidental release of its locking means.

3. A circuit controller comprising individual switches adapted upon closure to connect a translating circuit to a main supply circuit or to an auxiliary supply circuit selectively, an operating magnet for each of said switches energizable alternatively to close the respective switch, each of said switches being provided with means for biasing it to its open position and including means operable upon movement of either switch toward its closed position to render the locking means of the other switch inoperative and to open the latter and when open to lock the first switch closed, means adapted to energize said magnets selectively in accordance with the magnitude of a voltage, and means to deenergize said magnets when the respective switch is closed.

4. A circuit controller comprising individual switches adapted upon closure to connect a translating circuit to a main supply circuit or to an auxiliary supply circuit selectively, an operating magnet for each of said switches energizable alternatively to close the respective switch, each of said switches being provided with means for biasing it to its open position and including means operable upon movement of either switch toward its closed position to render the locking means of the other switch inoperative and to open the latter and when open to lock the first switch closed, means adapted to energize said magnets selectively in accordance with the magnitude of a voltage, means to deenergize said magnets when the respective switch is closed, and means adapted to reenergize said last named switch upon accidental release of its locking means.

5. In a circuit controller comprising, individual switches adapted upon closure to connect a translating circuit to a main supply circuit or to an auxiliary supply circuit selectively, an operating magnet for each switch energizable alternatively to close the respective switch, each of said switches being provided with means for biasing it to its open position and including means operable upon movement of either switch toward its closed position to render the locking means of the other switch inoperative and to open the latter and when open to lock the first switch closed, means to deenergize said electromagnets when the respective switch is closed, and manual means adapted to selectively operate said switches independently of said magnets, including means to render said magnets ineffective to actuate said switches.

6. A circuit controller comprising individual switches adapted upon closure to connect a translating circuit to a main supply circuit or to an auxiliary supply circuit selectively, an operating magnet for each switch energizable alternatively to close the respective switch, each of said switches being provided with means for biasing it to its open position, including means operable upon movement of either switch toward its closed position to render the locking means of the other switch inoperative and to open the latter and when open to lock the first switch closed, means adapted to energize said magnets selectively in accordance with the magnitude of a voltage, means to deenergize said magnets when the respective switch is closed, and manual means adapted to selectively operate said switches independently of said magnets, including means to render the latter ineffective to actuate said switches.

7. A circuit controller comprising in combination with a main supply circuit, an auxiliary supply circuit and a translating circuit, of a pair of individual switches adapted upon closure selectively to connect said translating circuit to said main supply circuit or to said auxiliary supply circuit respectively, an operating magnet for each switch energizable to close the same, each of said switches being provided with means for biasing it to its open position, mechanical means arranged to prevent simultaneous closure of both switches and to lock one switch closed by the opening of the other, a relay responsive to the voltage of one of said supply circuits and adapted to energize said magnets in accordance with said voltage selectively, means to interrupt the energizing circuit of said magnets when the respective switch is closed and to reenergize said magnets upon opening of the respective switch due to vibration, and manual means adapted to selectively operate said switches independently of said magnets, including means to render the latter ineffective to actuate said switches.

8. A circuit controller comprising in combination with a main supply circuit, an auxiliary supply circuit and a translating circuit, of a pair of individual switches adapted upon closure to connect said translating circuit to said main supply circuit and said auxiliary supply circuit selectively, a rocking shaft for each switch, an operating magnet for each switch energizable to rock said shaft to close the respective switch, each switch being provided with means to bias it to open position, an oscillatable shaft, a crank pin for each switch operatively connected with said oscillatable shaft, a connecting rod and a crank connecting each switch shaft with the respective crank pin, said pin and said rod being arranged to form a toggle which is locked when the respective switch is closed, and both toggles being arranged so that either of said switches is compelled to open when the other of said switches closes, a relay responsive to the voltage of one of said supply circuits and adapted to energize said magnets selectively in accordance with said voltage, means to interrupt the energizing circuit of said magnets when the respective switch is closed and to reenergize said magnets upon opening of the respective switch due to vibration, and manual means adapted to operate said oscillatable shaft to actuate said switches selectively and independently of said magnets, said last named means including means to render said magnets ineffective selectively to actuate said switches.

CLARENCE T. EVANS.